Feb. 23, 1971     D. A. WEMYSS     3,565,465
PIPE COUPLINGS

Filed March 19, 1969                      2 Sheets-Sheet 1

INVENTOR
DAVID ALAN WEMYSS
BY
ATTORNEYS

Feb. 23, 1971   D. A. WEMYSS   3,565,465
PIPE COUPLINGS

Filed March 19, 1969   2 Sheets-Sheet 2

INVENTOR
DAVID ALAN WEMYSS
BY
Young & Thompson
ATTORNEYS

United States Patent Office 3,565,465
Patented Feb. 23, 1971

3,565,465
PIPE COUPLINGS
David Alan Wemyss, Solihull, England, assignor to Ellay Enfield Tubes Limited, Maidenhead, Berkshire, England
Filed Mar. 19, 1969, Ser. No. 808,433
Claims priority, application England, Mar. 19, 1968, 13,266/68
Int. Cl. F16l 35/00
U.S. Cl. 285—81                    2 Claims

ABSTRACT OF THE DISCLOSURE

A pipe coupling including engaging tubular parts with an internal O-ring seal to provide a fluid tight joint when the parts are inserted one within the other and an anchorage device for locating the parts in an endwise direction and a slot or abutment to engage behind a shoulder on one or both of the parts. The anchorage is conveniently a resilient clip which can be inserted transversely over the assembled coupling.

---

Figure 1:
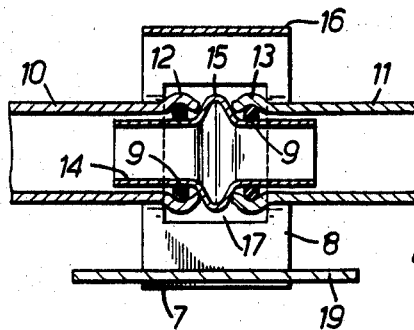

This invention relates to couplings between pipes, tubes, conduits, adapters or other hollow bodies or fittings, and is particularly though not exclusively adaptable to forming fluid pressure couplings especially for relatively low pressure fluids such as gas supply connections.

Numerous prior proposals have been made for forming joints between conduits but most prior proposals suffer from various disadvantages; in particular they are liable to be expensive, laborious to fit or install, insecure against vibration or high pressures, or applicable only to specially formed tube members. It is an object of the present invention to provide an improved coupling or joint which will be extremely simple to manufacture and install and applicable to a wide variety of purposes.

The invention is based on a coupling of the type in which one member has an annular groove receiving a sealing ring such as an O-ring and the other member is formed to cooperate with the first member and engage the sealing ring. By appropriate design and choice of dimensions such an engagement with the sealing ring can produce a very effective fluid seal but in itself such a joint has no longitudinal strength and one member can readily become separated from the other member as a result of internal pressure or external forces. Numerous prior proposals have been made to provide for some form of longitudinal anchorage between two pipe ends, such proposals usually involving deformation of the material of the pipe ends and/or complex tapered cam surfaces and screw threads. These known prior systems are often expensive and require special tools for assembly.

Now according to the present invention in a coupling or joint between two pipes, conduits, or other members providing tubular fluid passages, one member is formed with an annular groove receiving an annular sealing member, and the other member cooperates with the end of the first member and engages the seal, and the coupling or joint includes anchorage means for restraining the two members against separation in a longitudinal direction.

Preferably the anchorage means comprises a member formed to engage behind a shoulder on each of the two members, to restrain the two shoulders against separation. Alternatively the anchorage means may comprise two separate abutments each adapted to engage behind a shoulder on one of the two members and each abutment having means for connection to a base support, or to the other abutment.

For example the anchorage means may comprise one or more clip members formed to surround a respective one of the tubular members, and having one or more slots or depressions to receive a shoulder on the respective tubular member. Preferably each clip is non-circular and has two leg portions connected by a bend such that the legs can be sprung apart to allow the clip to be positioned on the pipe member or members.

Alternatively the two abutment means may be provided with adjusting means to vary the longitudinal displacement between the abutment surfaces. For example the abutment means may be screw threaded.

In one preferred construction according to the invention there is provided a coupling between two tubular members whose adjacent ends are formed with internal annular grooves receiving sealing rings, and external shoulders, comprising a coupling unit presenting two oppositely directed connecting tube portions to fit within the ends of the tube members and engage the seals thereof, locating means to prevent the coupling member from being displaced longitudinally and anchorage means engaged behind the shoulders on the two tube members, conveniently external ribs formed by the annular grooves, to hold the two tube members together.

From another aspect the invention consists in a coupling between a tube or pipe member having an external shoulder and an internal annular groove receiving a seal, and an internally screw threaded coupling unit or union, in which the union is provided with an integral or separate inner hollow tubular member spaced by a radial clearance from the internal screw thread, over which the open end of the pipe member can be fitted with the seal in engagement therewith, and including an external lock member adapted to engage behind the external shoulder formed on the pipe to hold the pipe in position against the union.

Conveniently the arrangement is such that a part of the pipe end abuts against part of the union to form an auxiliary seal.

Figure 2:
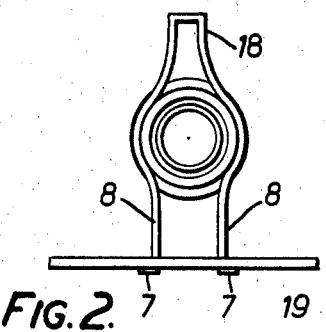
Figure 2A:
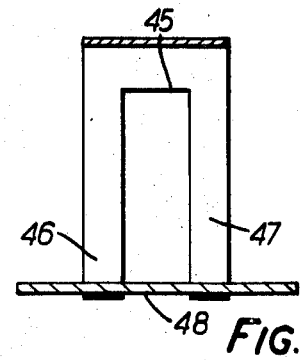
Figure 3:
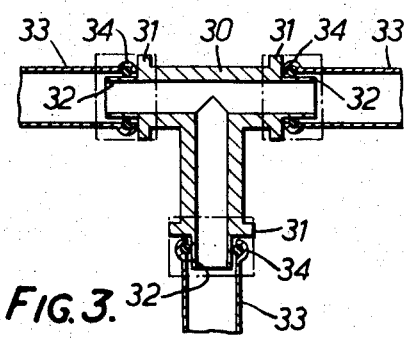
Figure 4:
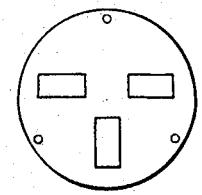
Figure 5:
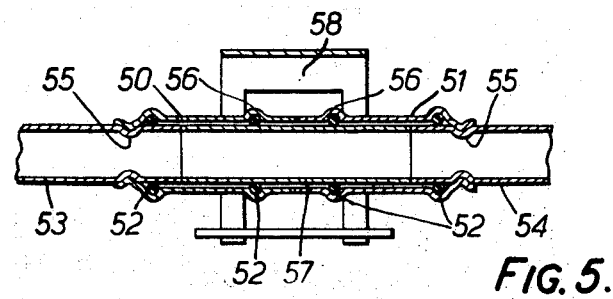
Figure 6:
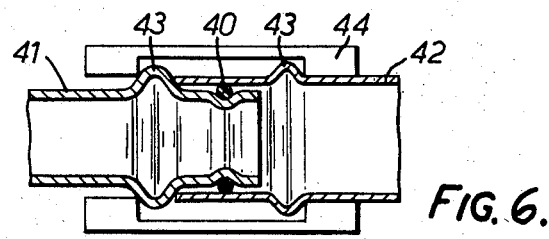
Figure 7:
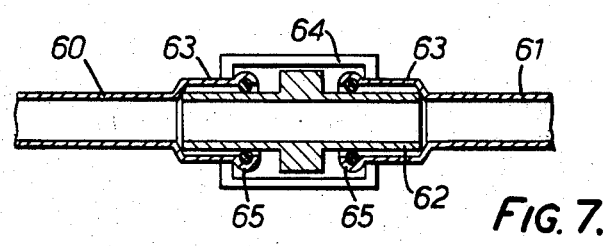

The invention may be performed in various ways and a number of embodiments will now be described by way of example with reference to the accompanying drawings, in which:

FIG. 1 is a sectional side elevation of a coupling between two pipe ends, including an anchorage clip holding the two pipes together endwise, FIG. 2 is an end view of the assembly of FIG. 1, FIG. 2A is a sectional side elevation through a modified form of anchorage clip, FIGS. 3 and 4 are a sectional plan view of a T-piece coupling and a support plate therefor, and FIGS. 5, 6 and 7 are sectional side elevations through three further possible modifications.

In the pipe coupling illustrated in FIGS. 1 and 2 two conduits such as lengths of pipe 10, 11, are each formed at their adjacent ends with a swaged internal annular groove which also provides an external annular rib 12, 13. In each groove is positioned an elastomeric O-ring seal 9. The two pipe ends are placed over the opposite ends of a short tubular connecting pipe 14 whose centre part is swaged outwards to form an annular external spacer rib or shoulder 15. The external dimensions of the ends of part 14 are such as to provide tight sealing engagement with the O-rings 9 and the rib 15 acts as a spacer between the two ends of the pipes and locates the part 14 against endwise movement. To hold the two pipe ends longitudinally together a spring clip 16 is positioned around the joint, this spring clip having a pair of curved legs 8 each with an aperture 17 in its curved part, suitably dimensioned to allow parts of the two external shoulders 12 and 13 to project through the apertures. The longitudinal dimension (parallel to the lengths of the pipes) of each aperture 17 is such that the two shoulders 12, 13, are held in close contact against the intermediate rib 15. The clip 16 has an upper bend 18 which allows the legs 8 of the clip to be flexed and the lower ends of the legs have feet 7 which are sprung into and located in a slot in a base plate 19. This base plate may be provided with bolt holes or other means for attachment to a rigid support. Alternatively the clip may be unsupported. It will be appreciated that when the clip is applied the two pipe ends are rigidly held together endwise and the seals 9 provide positive fluid-tight joints. This is achieved without any deformation of any parts during the assembly operation and involves no manipulation of screw threads, soldering or brazing operations.

Instead of a single aperture 17 two spaced parallel apertures may be provided to receive the individual shoulders 12 and 13. Alternatively two separate clips may be provided, together with means for holding the clips together longitudinally, either directly or by means of a common base support. If one of the pipe members is itself anchored to a base only one clip or other abutment is needed to engage behind the shoulder of the floating pipe member.

In the modified spring clip illustrated in FIG. 2A the slot 45 in the clip extends to the base forming two separate legs 46, 47. This facilitates insertion of the legs into the base plate 48 and a simple hand tool may be used to spring the legs forcibly into the slot in the plate.

The invention can also be applied readily to the formation of pipe couplings or joints with fittings such as T-pieces as illustrated in FIG. 3. In this example the T-piece 30 is formed with external annular ribs or shoulders 31 adjacent each of the reduced diameter tubular end pieces 32, the latter being designed to fit within the ends of pipe members 33 having internal annular grooves receiving O-rings, and external annular ribs 34, as in the previous example. In this particular example the pipe ends are held against the respective ends of the T-pieces by means of clips with apertures, similar to the clip illustrated in FIGS. 1 and 2, acting to engage behind a flange 31 and the respective external shoulder 34 on a pipe end. These clips in this example require no means of connection to a base or other external support but if required a base mounting plate with pairs of slots to receive the ends of the clips may be provided as shown in FIG. 4.

FIG. 5 illustrates a coupling, similar to that of FIGS. 1 and 2, but arranged to couple two connector sleeves 50, 51. Each sleeve has internal annular grooves adjacent opposite ends, accommodating O-ring seals 52, and the remote ends of the two sleeves are respectively connected to two pipes 53, 54, the end parts of each sleeve being crimped or otherwise deformed inwardly so as to deform the pipe walls at 55, and so positively lock each sleeve to the respective pipe. The adjacent inner ends of the sleeves provide external annular ribs 56, corresponding to the ribs 12 and 13 in FIG. 1, and the coupling is effected by bringing the two connector sleeves 50, 51, together, over a specially provided intermediate spacer tube 57, which is located between the ends of the pipes 53, 54, and finally applying a clip 58, similar to the example of FIG. 2A, around the sleeve ends to locate them in an endwise direction.

FIG. 6 illustrates a coupling according to the invention in which an O-ring 40 is positioned in an external annular groove on one pipe member 41, and a tubular part of the other pipe member 42 surrounds and engages the seal. Both members 41 and 42 have annular external beads 43 which are held together endwise by means of a clip 44. It will be appreciated in general that the invention may be used to form couplings between members of the same or different diameters and as shown in FIG. 6 a reduction in diameter can be obtained in one coupling.

In the further modification illustrated in FIG. 7, the coupling is basically similar to that illustrated in FIG. 1, but the two pipes 60, 61, to be coupled have the same internal diameter as the connecting member 62, and the end parts of the two pipes are expanded at 63 to fit over the ends of the member 62, thus providing a through flow passage of uniform diameter. The two pipe ends are held together endwise by a clip 64, having edge surfaces abutting against the external annular ribs 65 at the ends of the two pipes.

I claim:

1. A coupling comprising two coaxial tubes one of which has a wall formed to provide an annular groove and an external annular shoulder, the other tube having an external annular shoulder thereon which is disposed outside said one tube, said other tube having a cylindrical portion in telescoping relation with said one tube, an annular sealing member in said groove and in slidable sealing contact with said cylindrical portion, and a resilient clip for holding said tubes together axially, said clip being of sheet material bent to U-shape with said sheet material and the bend of the U disposed parallel to the axis of the tubes, the clip havig limbs that straddle the tubes, each limb comprising a pair of legs that are coplanar and are spaced apart axially of the tubes with both said shoulders disposed between the legs of each said limb whereby the legs of each said limb engage said shoulders to restrain movement of the tubes away from each other, and means disposed on the side of the tubes opposite said bend and rigidly interconnecting said limbs in a direction perpendicular to said axis and rigidly interconnecting the legs of each limb in a direction parallel to said axis.

2. A coupling comprising three coaxial tubes two of which have each a wall formed to provide an annular groove and an external annular shoulder, the third tube having cylindrical portions that extend in opposite directions into telescoping relation with said two tubes, annular sealing members in each of said grooves and in slidable sealing contact with said cylindrical portions, and a resilient clip for holding said tubes together axially, said clip being of sheet material bent to U-shape with said sheet material and the bend of the U disposed parallel to the axis of the tubes, the clip having limbs that straddle the tubes, each limb comprising a pair of legs that are coplanar and are spaced apart axially of the tubes with both said shoulders disposed between the legs of each said limb whereby the legs of each said limb engage said shoulders to restrain movement of the tubes away from each other, and means disposed on the side of the tubes opposite said bend and rigidly interconnecting said limbs in a direction perpendicular to said axis and rigidly interconnecting the legs of each limb in a direction parallel to said axis.

References Cited

UNITED STATES PATENTS

| 1,436,882 | 11/1922 | Knepper | 285—319 |
|---|---|---|---|
| 1,782,484 | 11/1930 | Spencer et al. | 285—398X |
| 2,457,105 | 12/1948 | Patterson | 285—364X |
| 2,582,746 | 1/1952 | Champion | 285—406X |
| 2,596,020 | 5/1952 | Fletcher et al. | 285—61 |
| 2,933,333 | 4/1960 | Bredtschneider et al. | 285—371X |
| 3,129,476 | 4/1964 | Sindlinger | 285—420X |
| 3,215,455 | 11/1965 | Fiala et al. | 285—233 |

FOREIGN PATENTS

| 1,213,917 | 11/1959 | France | 285—61 |
|---|---|---|---|
| 1,513,350 | 1/1968 | France | 285—81 |

DAVE W. AROLA, Primary Examiner

U.S. Cl. X.R.

285—371, 374, 420